United States Patent
Li et al.

(10) Patent No.: US 10,607,225 B2
(45) Date of Patent: *Mar. 31, 2020

(54) VOICE FILTER SYSTEM

(71) Applicant: VISA INTERNATIONAL SERVICE ASSOCIATION, San Francisco, CA (US)

(72) Inventors: Shaw Li, San Francisco, CA (US); Dhiraj Sharda, Fremont, CA (US); Douglas Fisher, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/960,032

(22) Filed: Apr. 23, 2018

(65) Prior Publication Data

US 2018/0247314 A1    Aug. 30, 2018

Related U.S. Application Data (63) Continuation of application No. 14/315,092, filed on Jun. 25, 2014, now Pat. No. 9,978,065.

(60) Provisional application No. 61/839,197, filed on Jun. 25, 2013.

(51) Int. Cl.
G06Q 20/40        (2012.01)
G06F 21/32        (2013.01)
G10L 17/22        (2013.01)
G07C 9/00         (2020.01)

(52) U.S. Cl.
CPC ....... *G06Q 20/40145* (2013.01); *G06F 21/32* (2013.01); *G10L 17/22* (2013.01); *G07C 9/00087* (2013.01)

(58) Field of Classification Search
CPC ... G06Q 20/40145; G06F 21/32; G10L 17/22; G07C 9/00087
See application file for complete search history.

(56) References Cited

U.S. PATENT DOCUMENTS 6,510,415 B1    1/2003  Talmor et al.
7,500,004 B1 *  3/2009  Homer ................... H04L 67/06
                                                707/999.006

(Continued)

OTHER PUBLICATIONS

U.S. Appl. No. 14/315,092 , "Final Office Action", dated Mar. 1, 2016, 12 pages.

(Continued)

*Primary Examiner* — Qian Yang
(74) *Attorney, Agent, or Firm* — Kilpatrick Townsend & Stockton LLP (57) ABSTRACT

Embodiments of the invention are directed to systems and methods for authentication using audio filtering. In some embodiments, an original audio segment such as a voice segment may be received. The received original audio segment may be modified using a first predetermined algorithm. The modified audio segment may be sent to an authentication server. At the authentication server, the modified audio segment may be reconstructed into the original audio segment using a second predetermined algorithm. The client device may be authenticated for a transaction based at least in part on the reconstructed original audio segment.

20 Claims, 8 Drawing Sheets

(56) References Cited

U.S. PATENT DOCUMENTS

| | | |
|---|---|---|
| 2003/0055646 A1* | 3/2003 | Yoshioka .............. G10L 13/033 704/258 |
| 2003/0076245 A1* | 4/2003 | Gibson ................ H04L 1/0006 341/50 |
| 2004/0064309 A1 | 4/2004 | Kosai |
| 2005/0267752 A1* | 12/2005 | Navratil ............... G06K 9/6226 704/244 |
| 2007/0185718 A1 | 8/2007 | Di Mambro et al. |
| 2007/0233483 A1* | 10/2007 | Kuppuswamy ......... G10L 17/20 704/247 |
| 2008/0228476 A1* | 9/2008 | Mehrotra ............. G10L 19/032 704/230 |
| 2009/0043574 A1 | 2/2009 | Gao et al. |
| 2010/0086108 A1 | 4/2010 | Jaiswal et al. |
| 2011/0072088 A1 | 3/2011 | Kiyohara et al. |
| 2011/0099009 A1 | 4/2011 | Zopf et al. |
| 2013/0232073 A1 | 9/2013 | Sheets et al. |
| 2014/0172430 A1 | 6/2014 | Rutherford et al. |
| 2014/0379342 A1 | 12/2014 | Li et al. |

OTHER PUBLICATIONS

U.S. Appl. No. 14/315,092 , "Final Office Action", dated Jun. 7, 2017, 15 pages.

U.S. Appl. No. 14/315,092 , "Non Final Office Action", dated Jan. 11, 2017, 16 pages.

U.S. Appl. No. 14/315,092 , "Non-Final Office Action", dated Sep. 16, 2015, 11 pages.

U.S. Appl. No. 14/315,092 , "Non-Final Office Action", dated Jun. 30, 2016, 13 pages.

U.S. Appl. No. 14/315,092 , "Non-Final Office Action", dated Sep. 29, 2017, 16 pages.

U.S. Appl. No. 14/315,092 , "Notice of Allowance", dated Jan. 23, 2018, 8 pages.

* cited by examiner

VOICE FILTER SYSTEM

CROSS-REFERENCES TO RELATED APPLICATIONS

This application is a continuation of U.S. Non-Provisional patent application Ser. No. 14/315,092 filed on Jun. 25, 2014, which claims priority to U.S. Provisional Application No. 61/839,197 titled "VOICE FILTER SYSTEM" filed on Jun. 25, 2013, the entire contents of which are hereby incorporated by reference for all purposes.

BACKGROUND

Embodiments of the invention are directed to systems and methods that allow for cardholder verification using voice biometric techniques. A number of instances have occurred where a cardholder may wish to make a purchase with their mobile device or initiate some other type of e-commerce transaction from their mobile device. However, these types of purchases/transactions inherently carry a high risk because the cardholder does not use their physical payment card to complete the purchase/transaction. As such, many card issuers or merchants may wish to have an extra level of security to verify the identity of the cardholder wishing to complete the purchase/transaction with their mobile device. However, many current solutions are vulnerable to replay attacks by fraudsters who record or otherwise obtain the user's voice during voice authentication.

Embodiments of the invention address this and other problems, both individually and collectively.

SUMMARY

Embodiments of the invention are directed to systems and methods for audio filtering. More specifically, embodiments of the invention relate to systems and methods for modifying original audio segment data of an original audio segment. The original audio segment data can be modified using a predetermined algorithm. The modified audio segment data can then be transmitted to a server computer, where the server computer can store previous original audio segment data associated with the client device in an audio model stored within a database. The server computer can determine the original audio segment data from the modified audio segment data using a second predetermined algorithm. The server computer can then compare the original audio segment data to previously stored original audio segment data and determine whether they match. If they match, the server computer can authenticate the client device.

The systems and methods described herein can prevent a fraudster from capturing the original audio segment (e.g., voice segment) at the time the user provides it to the mobile device and later use the captured original audio segment for fraudulent authentication (also known as a "replay attack"). Since the original audio segment data is modified prior to transmitting the audio segment data to the server computer, the fraudster would be unable to use the captured original audio segment for fraudulent authentication. Further, the predetermined algorithm used to modify the original audio segment data may be unique to each authentication attempt.

In some embodiments, a method for authentication includes receiving, at a server computer from a client device, modified audio segment data for a modified audio segment, wherein the first original audio segment data was modified using a first predetermined algorithm to create the modified audio segment data. The method also includes determining, by the server computer, the first original audio segment data from the modified audio segment data, using a second predetermined algorithm. The method additionally includes determining, by the server computer, if the first original audio segment data matches previously stored second original audio segment data stored in a database. The method further includes determining, by the server computer, that the client device is authentic when the first and second original audio segment data matches.

In some embodiments, the first predetermined algorithm is an audio filter.

In some embodiments, determining that the user is authentic further comprises determining a match score based at least in part on a quality of the match.

In some embodiments, the second original audio segment is stored within a audio model in the database, the method further comprising updating the audio model with the first original audio segment data upon determining that the user is authentic.

In some embodiments, the modified audio segment data is encoded data, and determining the first original audio segment data from the modified audio segment data comprises decoding the modified audio segment data.

In some embodiments, a server computer includes a processor and a non-transitory computer-readable storage medium, comprising code executable by the processor for implementing the above described method for authenticating a user.

In some embodiments, a method for authentication includes receiving, at a client device, an original audio segment. The method also includes creating, by the client device, first original audio segment data from the original audio segment. The method additionally includes modifying, by the client device, the first original audio segment data using a first predetermined algorithm to create modified audio segment data. The method further includes transmitting, to a server computer by the client device, the modified audio segment data, wherein the first original audio segment data is determined by the server computer from the modified audio segment data using a second predetermined algorithm, and wherein the server computer determines whether the first original audio segment data matches previously stored second original audio segment data stored in a database, and wherein it is determined that the client device is authentic when the first and second original audio segment data matches.

In some embodiments, the first predetermined algorithm is an audio filter.

In some embodiments, the client device replays the modified audio segment.

In some embodiments, a client device includes a processor and a non-transitory computer-readable storage medium, comprising code executable by the processor for implementing the above described method for authenticating a user.

DETAILED DESCRIPTION

Prior to discussing the specific embodiments of the invention, a further description of some terms can be provided for a better understanding of embodiments of the invention.

A "payment device" may include any suitable device capable of making a payment transaction. For example, a payment device can include a card such as a credit card, debit card, charge card, gift card, or any combination thereof. As another example, a payment device can be a communication device that is used to conduct a payment transaction.

A "payment processing network" (e.g., VisaNet™) may include data processing subsystems, networks, and operations used to support and deliver payment related services (e.g., authentication services, authorization services, exception file services, and clearing and settlement services, etc.). An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

A "server computer" can be a powerful computer or a cluster of computers. For example, the server computer can be a large mainframe, a minicomputer cluster, or a group of servers functioning as a unit. In one example, the server computer may be a database server coupled to a Web server, and may include or be coupled to a database.

An "access device" can be any suitable device configured to process payment transactions. For example, an access device (e.g., a point-of-sale (POS) terminal, etc.) can be used to process payment transactions such as credit card or debit card transactions, or electronic settlement transactions, and may have optical, electrical, or magnetic readers for reading data from devices such as smart cards, keychain device, cell phones, payment cards, security cards, access cards, and the like.

An "acquirer" can be a business entity (e.g., a commercial bank) that typically has a business relationship with a merchant. An acquirer may receive some or all of the transactions from that merchant.

An "issuer" can be a business entity which issues a payment account that can be used to conduct transactions. Typically, an issuer is a financial institution.

An "account holder" can be a user who is authorized to conduct transactions with a payment account. The account holder can be, for example, the account owner of the account associated with a payment device, or an individual who is authorized to use the account on behalf of the account owner. The terms "account holder" and "user" may be used interchangeably in the following description.

A "client device," as described herein, can be any electronic communication device that can execute and/or support electronic communications including, but not limited to, payment transactions. Some examples include a personal digital assistant (PDA), a smart phone, tablet computer, notebook computer, and the like. A client device may also be referred to as a "communication device" and/or a "mobile device".

An "authorization request message" may be an electronic message that is sent to request authorization for a transaction. An authorization request message can be sent, for example, to a payment processing network and/or an issuer of a payment device. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. An authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a issuer bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

A "digital wallet provider" may include any suitable entity that provides a digital wallet service. A digital wallet provider may provide software applications that store account numbers, account numbers including unique identifiers, or representations of the account numbers (e.g., tokens), on behalf of an account holder to facilitate payments at more than one unrelated merchant, perform person-to-person payments, or load financial value into the digital wallet.

"Biometric data" may refer to data that can be used to uniquely identify an individual based upon one or more intrinsic physical or behavioral traits. For example, biometric data may include fingerprint data and retinal scan data. Further examples of biometric data include digital photographic data (e.g., facial recognition data), deoxyribonucleic acid (DNA) data, palm print data, hand geometry data, and iris recognition data. In the context of the present disclosure, biometric data may include voice data.

"Speaker recognition" may refer to the identification of a user based on characteristics of their voice (voice biometrics). Speaker recognition uses the acoustic features of speech that have been found to differ between individuals. These acoustic patterns reflect both anatomy (e.g., size and shape of the throat and mouth) and learned behavioral patterns (e.g., voice pitch, speaking style).

"Speech recognition" may refer to the translation of spoken words into text understandable by a computer system. Speech recognition combined with speaker recognition may simplify the task of translating speech in systems that are used to authenticate or verify the identity of a speaker as part of a security process.

"Voice recognition" may be used to describe both "speaker recognition" and "speech recognition".

A "voice model" can be a model that incorporates the user's voice constructed from prior voice samples received from the user. The voice model can be used to determine a risk factor associated with a user. The voice model may contain information about current and prior user authentications with a verification system. For example, the voice model may contain the time, location, voice data, and match score associated with each particular voice authentication with the verification system by the user. The combination of information within the voice model about prior authentications may be used to determine the risk factor associated with the user.

A "prompt" can be a combination of a number of words arranged in a particular order that requests a response. A user may be requested to repeat a prompt for authentication purposes. The terms "prompt" and "word string" may be used interchangeably in the following description.

A "voice segment" can be an audio sample of a user' voice. For example, a voice segment may be a captured audio signal of a user's voice who wishes to authenticate with a transaction system.

A "modified voice segment" can be a modified version of a voice segment. The modified voice segment can be produced from the voice segment by altering it some way. The modified voice segment can have different auditory characteristics than the original voice segment.

"Voice segment data" can be a digital representation of a voice segment. For example, the voice segment data can include a series of binary digits that represent the voice segment. When a module or application processes the voice segment data, the voice segment can be accurately reproduced.

"Modified voice segment data" as described herein, can be a digital representation of a modified voice segment. For example, the modified voice segment data can include a series of binary digits that represent the modified voice segment. When a module or application processes the modified voice segment data, the modified voice segment can be accurately reproduced.

A "predetermined algorithm" can include any procedure for calculation, data processing, and/or automated reasoning. A predetermined algorithm may modify or manipulate a voice segment data in order to produce modified voice segment data. For example, the predetermined algorithm can be a voice filter that effectively changes the pitch and/or tone of a user-provided voice sample.

A "match score" or "match" can be a quantitative value that characterizes a relationship between received input data and stored data. In the context of the present disclosure, the received input data can be a captured voice sample. The stored data can be a previously captured and stored voice sample or the voice model. The match score may express the degree of confidence that the received input data and the stored data correlates with each other (e.g., originated from the same individual). The match score may be passed to other parts of a risk scoring mechanism, such that the match score contributes along with other risk parameters to an overall decision that may be used, for example, for approving or declining a transaction. An appropriate threshold can be set to ensure an acceptable level of accuracy. This concept can be applied to other biometric data apart from voice samples (e.g., retinal scans, facial recognition data, etc.).

Embodiments described broadly herein allow for voice filtering for authentication purposes via the communication device 110. More specifically, the embodiments described here pertain to transactions initiated from the communication device 110, such as a mobile phone or personal computer, for both in-person transactions and remote transactions. The authentication may be accomplished using voice biometric techniques, for example, prompted text independent speaker verification. As described above, the voice biometric techniques may be subject to replay attacks by a fraudster. The voice filtering may prevent replay by altering the user's received voice segment using a selected voice filter. Only the user may know the selected filter used for authentication, thus making it difficult for fraudsters to use replay techniques to illicitly authenticate with the system. Furthermore, the voice filtering provides the user with the perception of a safer authentication method while simultaneously adding an enjoyable aspect to authentication. For example, the voice filtering may alter a user's voice sample such that when it is replayed it sounds similar to a voice of a fictional character such as Mickey Mouse or Donald Duck.

Figure 1:
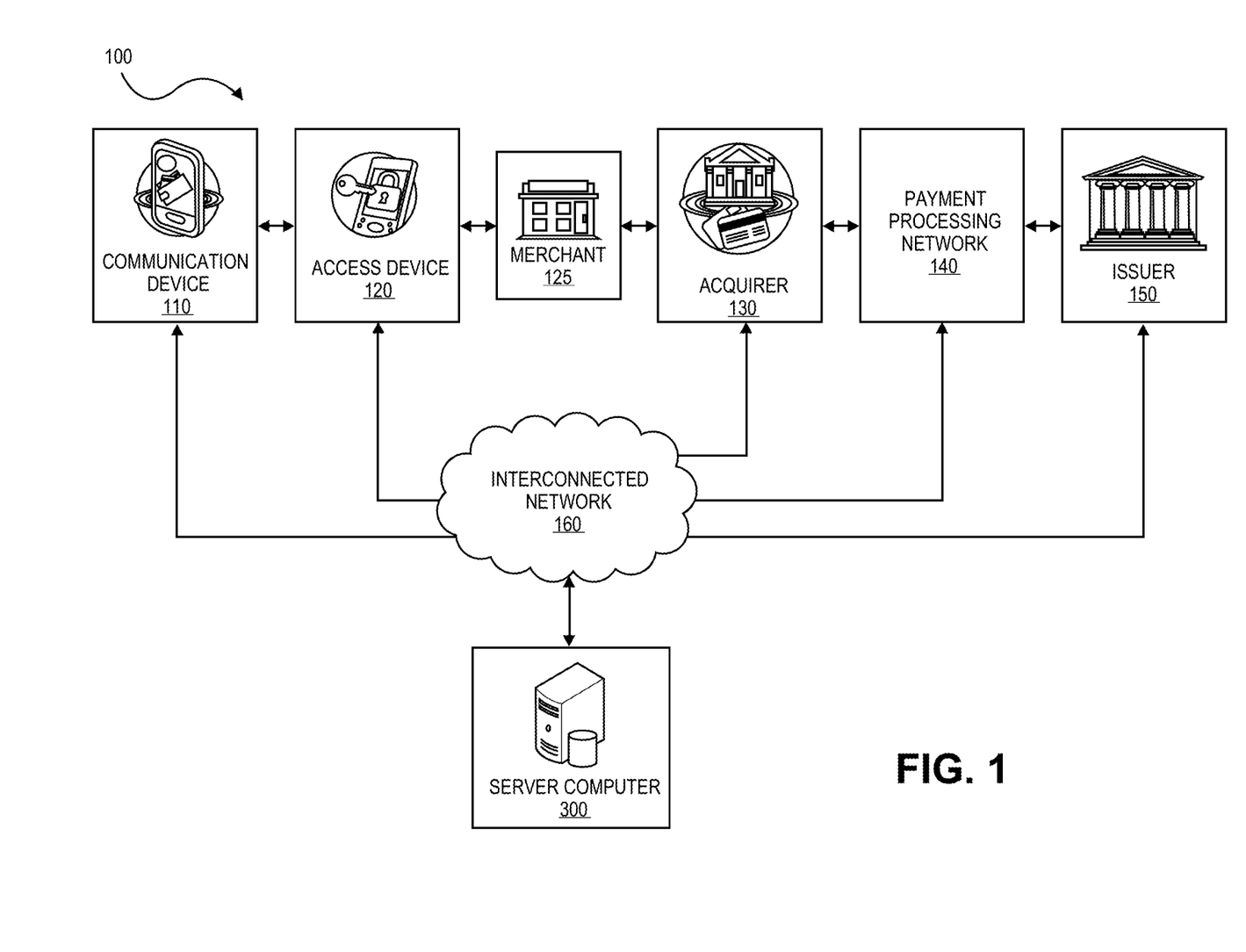
FIG. 1 is a block diagram of a payment system, according to an embodiment of the present invention.

FIG. 1 is a block diagram of a payment system 100, according to some embodiments. The system 100 includes a communication device 110, an access device 120, a merchant 125, an acquirer 130, a payment processing network 140, an issuer 150, interconnected network 160, and a server computer 300. The acquirer 130 may further include an acquirer computer (not shown). The issuer 150 may further include an issuer computer (not shown). The payment processing network 140 may include an authorization and settlement server and/or additional servers (not shown) to carry out the various transactions described herein. In some embodiments, the server computer 300 may reside within the payment processing network 140 or issuer 150.

In some embodiments, the communication device 110 may be in electronic communication with the access device 120. The communication device 110 can be a personal digital assistant (PDA), a smart phone, tablet computer, notebook computer, or the like, that can execute and/or support payment transactions with a payment system 100. A communication device 110 can be used in conjunction with a payment device, such as a credit card, debit card, charge card, gift card, or other payment device and/or any combination thereof. The combination of a payment device (e.g., credit card) and the communication device 110 (e.g., smart phone) can be referred to as the communication device 110 for illustrative purposes. In some embodiments, the communication device 110 may be used in conjunction with transactions of currency or points (e.g., points accumulated in a particular software application). In some embodiments, the communication device 110 may be a wireless device, a contactless device, a magnetic device, or other type of payment device. In some embodiments, the communication device 110 includes software (e.g., application) and/or hardware to perform the various payment transactions and capture user voice data as further described below. For example, the communication device 110 can include a digital wallet application associated with a digital wallet provider.

The access device 120 may be configured to be in electronic communication with the acquirer 130 via a merchant 125. In one embodiment, the access device 120 may be a point-of-service (POS) device. Alternatively, the access device 120 can be any suitable device configured to process payment transactions such as credit card or debit card transactions, or electronic settlement transactions, and may have optical, electrical, or magnetic readers for reading data from portable electronic communication devices such as smart cards, keychain device, cell phones, payment cards, security cards, access cards, and the like. In some embodiments, the access device 120 may be located at and controlled by a merchant. For example, the access device 120 can be a POS device at a grocery store checkout line. In some embodiments, the access device 120 can be a client computer or a mobile phone in the event that the user is conducting a remote transaction.

The acquirer 130 (e.g., acquirer bank) may include an acquirer computer (not shown). The acquirer computer can be configured to transfer data (e.g., bank identification number (BIN), etc.) and financial information to the payment processing network 140. In some embodiments, the acquirer 130 does not need to be present in the system 100 for the communication device 110 to transfer the financial and user data to the payment processing network 140. In one non-limiting example, the acquiring bank 130 can additionally check the credentials of the user against a watch list in order to prevent fraud and money laundering schemes.

In some embodiments, the payment processing network 140 is VisaNet™, where Visa internal processing (VIP) performs the various payment processing network 140 or multi-lateral switch functions described herein. The payment processing network 140 can include an authorization and settlement server (not shown). The authorization and settlement server ("authorization server") performs payment authorization functions. The authorization server is further configured to send and receive authorization data to the issuer 150. Furthermore, the payment processing network 140 can receive a voice sample by the user (e.g., from the payment device 110, access device 120, or acquirer 130) to determine a risk factor associated with a transaction, as further described below.

In some embodiments, the issuer 150 is a business entity which issues a card to a card holder. Typically, an issuer is a financial institution. The issuer 150 is configured to receive the authorization data from the payment processing network 140 (e.g., the authorization server). The issuer 150 receives authentication data from the authorization server and determines if the user is authorized to perform a given financial transaction (e.g., cash deposit/withdrawal, money transfer, balance inquiry) based on whether the user was authenticated by an identification system.

In some embodiments, the communication device 110 may be connected to and communicate with the payment processor network 140 via an interconnected network 160. One example of an interconnected network 160 is the Internet. The payment processor network 140 may inform the communication device 110 when a payment has been successfully processed. In some embodiments, the payment processor network 140 may be connected to and communicate with the access device 120 via the interconnected network 160. The payment processor network 140 may inform the access device 120 when a payment has been successfully processed. In turn, the access device 120 may complete the transaction with the communication device 110.

A server computer 300 is also shown in FIG. 1, and is in operative communication with the interconnected network 160. The server computer 300 may include a voice database (described below) that includes stored voice model(s) of a user for authentication purposes and a algorithm database (described below) that includes predetermined algorithms for modifying voice segment data associated with a user-provided voice segment. The voice model may be created for the user at the time of enrollment with the authentication system. The voice model may subsequently be updated over time as additional voice samples are captured during subsequent user authentications performed with the authentication system.

The interconnected network 160 may comprise one or more of a local area network, a wide area network, a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

In a typical payment transaction in some embodiments, a user may interact with the access device 120 (e.g., with a payment device such as a payment card, communication device, or by entering payment information) to conduct a transaction with the merchant 125. The merchant 125 may operate a merchant computer, which may route an authorization request message to the acquirer 130, and eventually to the issuer 150 via the payment processing network 140. The issuer 140 will then determine if the transaction is authorized (e.g., by checking for fraud and/or sufficient funds or credit). The issuer will then transmit an authorization response message to the terminal 120 via the payment processing network 140 and the acquirer 130.

The transaction is cleared and settled between the acquirer 130 and the issuer 150 by the payment processing network 140, for example, at the end of the day.

The description below provides descriptions of other components in the system as well as authentication methods using authenticating a user for a transaction based on a received voice segment. The authentication methods can be performed at any suitable point during the above-described transaction flow.

For example, a user may be at a merchant location (e.g., a supermarket) and initiate a payment transaction to checkout for the items in the user's shopping cart. The user may initiate the payment transaction by interfacing with the access device 120 via his/her communication device 110. Upon initiating the transaction, the communication device 110 may request that the user repeat a specified prompt. The user may speak the specified prompt into the communication device 110 and the communication device may capture the voice segment. The communication device 110 may then apply a predetermined filter to the voice segment data associated with the voice segment to create modified voice segment data. The predetermined filter may be one selected by the user via the communication device 110. The modified voice segment data may be sent by the communication device 110 to the server computer 300. The server computer 300 may apply a second predetermined algorithm to the modified voice segment data to obtain the original voice segment data. The second predetermined algorithm may be a specific algorithm intended to recover the original voice segment data from the modified voice segment data. The server computer 300 may then compare the original voice segment data to a voice model associated with the user. If the original voice segment data and the voice model match, the server computer 300 may indicate to the communication device 110 that the user is authenticated for the transaction. The transaction may then proceed and go through the steps involved in a regular payment transaction.

Figure 2:
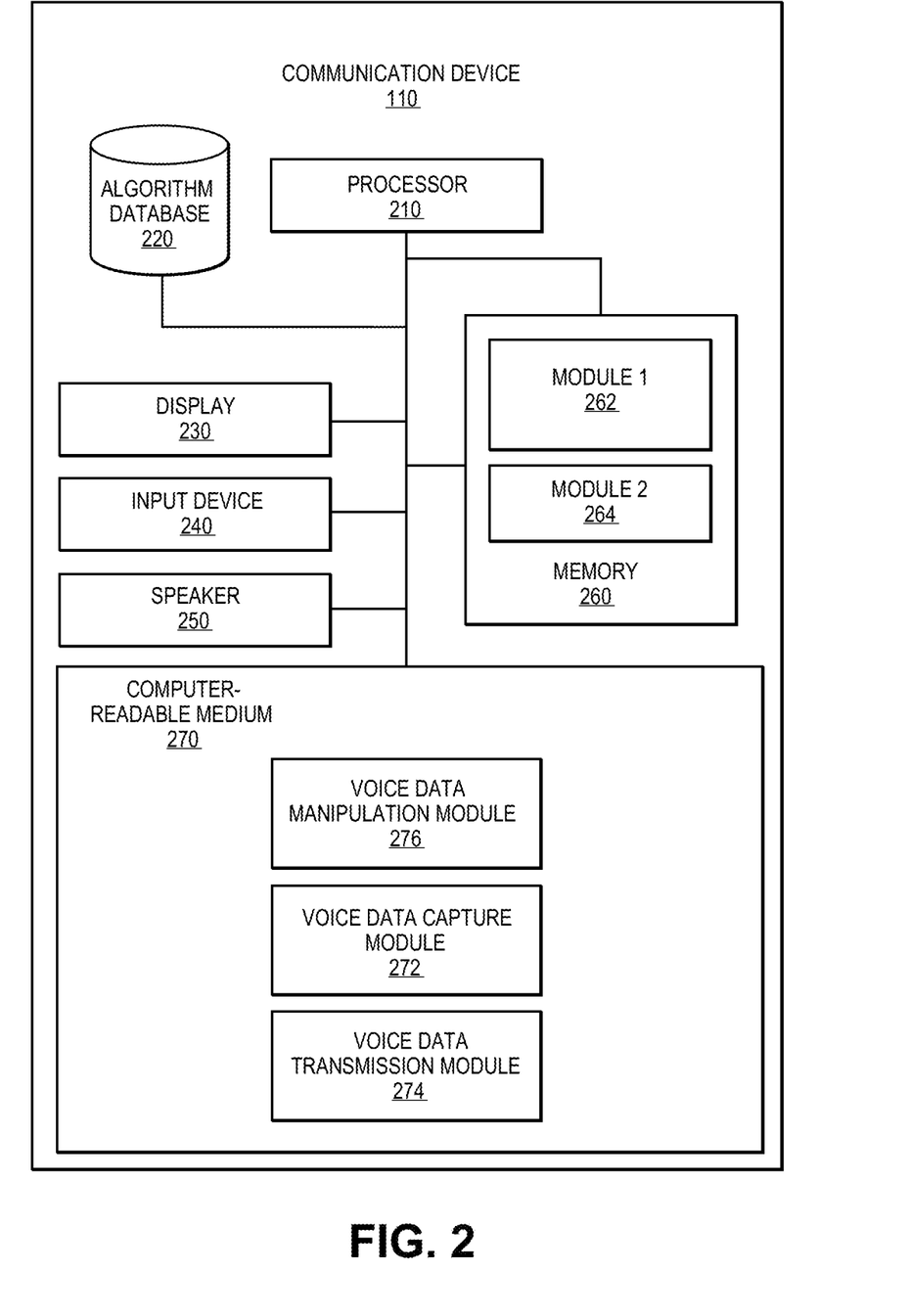
FIG. 2 is a block diagram of communication device, according to some embodiments.

FIG. 2 is a block diagram of a communication device 110, according to some embodiments. Communication device 110 includes a processor 210, an algorithm database 220, a display 230, an input device 240, a speaker 250, a memory 260, and a computer-readable medium 270.

Processor 210 may be any suitable processor operable to carry out instructions on the communication device 110. The processor 210 is coupled to other units of the communication device 110 including algorithm database 220, display 230, input device 240, speaker 250, memory 260, and computer-readable medium 270.

Algorithm database 220 may be any database that stores any number of predefined algorithms. In some embodiments, the predefined algorithms may be different voice filters that can modify user-provided voice segment data to create modified voice segment data. Many of these filters can change the auditory characteristics of the user-provided voice segment data. For example, applying one of the predefined algorithms to user-provided voice segment data may make the user sound like a cartoon character, etc. The algorithm database 220 can be updated at any time to add or remove the predefined algorithms. In some embodiments, a predefined algorithm can be removed in-real time after it has been used once. The algorithm database 220 can also be updated with predefined algorithms that are downloaded from the server computer 300 (FIG. 1).

Display 230 may be any device that displays information to a user. Examples may include an LCD screen, CRT monitor, or seven-segment display.

Input device 240 may be any device that accepts input from a user. Examples may include a keyboard, keypad, mouse, or microphone. In the case of a microphone, the microphone may be any device that converts sound to an electric signal. In some embodiments, the microphone may be used to capture one or more voice segments from a user.

Speaker 250 may be any device that outputs sound to a user. Examples may include a built-in speaker or any other device that produces sound in response to an electrical audio signal. In some embodiments, speaker 250 may be used to request the user for a voice sample for purposes of authentication.

Memory 260 may be any magnetic, electronic, or optical memory. Memory 260 includes two memory modules, module 1 262 and module 2 264. It can be appreciated that memory 260 may include any number of memory modules. An example of memory 260 may be dynamic random access memory (DRAM).

Computer-readable medium 270 may be any magnetic, electronic, optical, or other computer-readable storage medium. Computer-readable storage medium 270 includes voice data capture module 272 and voice data transmission module 274. Computer-readable storage medium 270 may comprise any combination of volatile and/or non-volatile memory such as, for example, buffer memory, RAM, DRAM, ROM, flash, or any other suitable memory device, alone or in combination with other data storage devices.

Voice data capture module 272 can be configured to cause the communication device 110 to capture voice segments, via input device 240, from a user for voice authentication purposes. In some embodiments, voice data capture module 272 may cause the communication device 110 to capture voice segments by the user for purposes of initially registering a user for the first time for subsequent voice authentication. In some embodiments, voice data capture module 272 may cause the communication device 110 to capture voice segments, via input device 240, for purposes of authenticating a user in order to complete a transaction. For example, communication device 110 may request that a user to register or authenticate his/her voice data by displaying a prompt, on display 230, to repeat (by speaking into the microphone) a specific prompt. In some embodiments, the prompt can also be outputted by the speaker 250. Upon capturing the user's voice segment via the microphone, the voice data capture module 272 can digitize the voice segment into voice segment data. The voice segment data corresponding to the prompted prompt may be transmitted to a server computer using the voice data transmission module 274 and the data processor 210 for purposes of storing the voice data for future user authentication or for authenticating the user based on a stored voice model, described below.

Voice data transmission module 274 can be configured to cause the communication device 110 to transmit voice segment data to a server computer. In some embodiments, the voice segment data may be modified voice segment data, as described in further detail below.

Voice data manipulation module 276 can be configured to cause the communication device 110 to modify and/or manipulate voice segment data associated with a user-provided voice segment. In some embodiments, the modification of the voice segment data can include applying a predetermined algorithm from the algorithm database 220 to the voice segment data. By applying the predefined algorithm to the voice segment data, the voice data manipulation module 276 may alter the voice segment data to produce modified voice segment data. The original voice segment data may be reproduced from the modified voice segment data using a second predetermined algorithm, described in further detail below.

Figure 3:
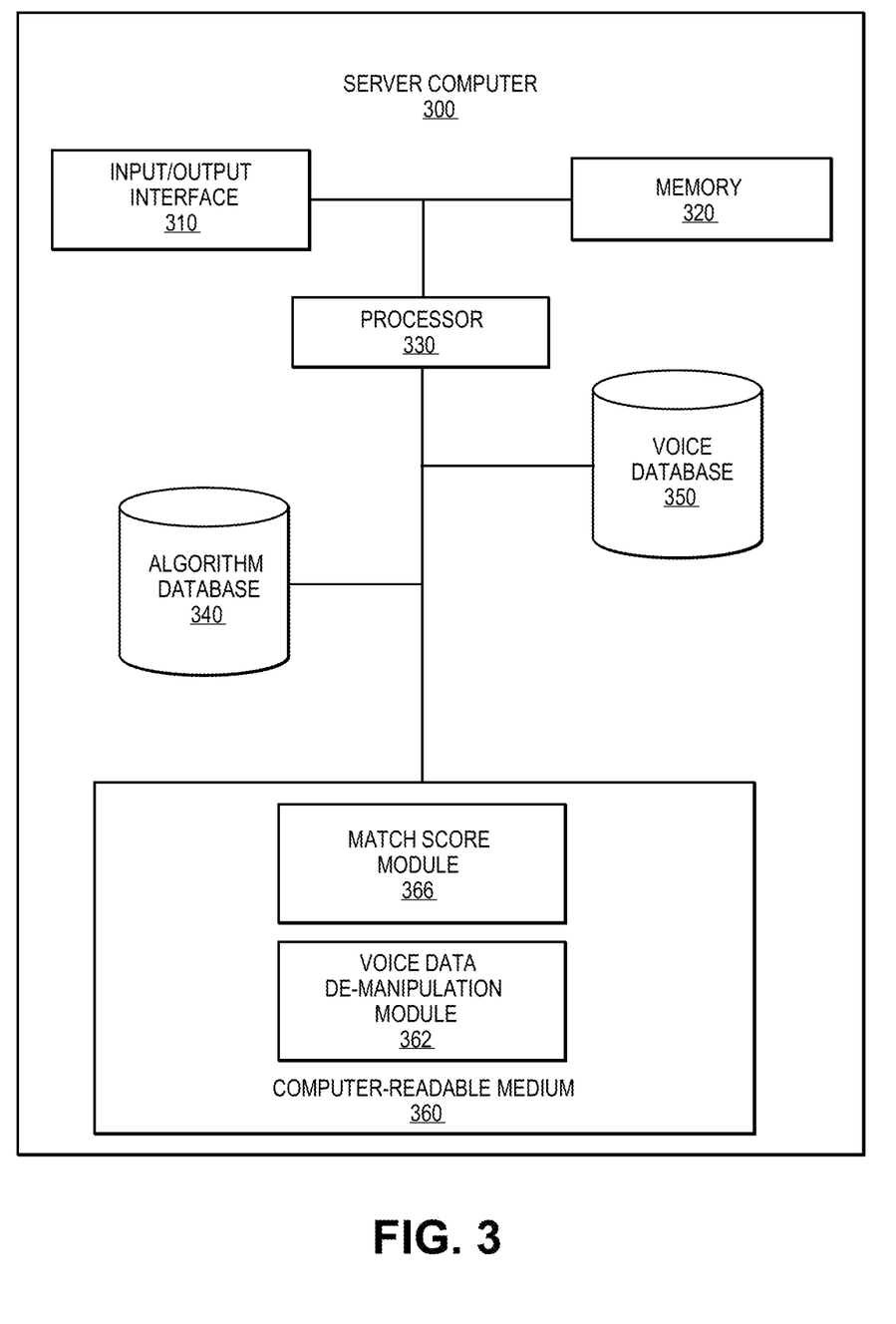
FIG. 3 is a block diagram of server computer, according to some embodiments.

FIG. 3 is a block diagram of a server computer 300, according to some embodiments of the present invention. Server computer 300 includes an input/output interface 310, a memory 320, a processor 330, an algorithm database 340, a voice database 350, and a computer-readable medium 360. In some embodiments, the server computer 300 may reside within the interconnected network 160 (FIG. 1). In some embodiments, the server computer 300 may reside within the payment processor network 140 (FIG. 1).

The input/output (I/O) interface 310 is configured to receive and transmit data. For example, the I/O interface 310 may receive an authorization request message from the acquirer 130 (FIG. 1). The I/O interface 310 may also be used for direct interaction with the server computer 300. The I/O interface 210 may accept input from an input device such as, but not limited to, a keyboard, keypad, or mouse. Further, the I/O interface 310 may display output on a display device. The I/O interface 310 may also receive communications from the communication device 110 (FIG. 1), such as a voice segment from the user.

Memory 320 may be any magnetic, electronic, or optical memory. It can be appreciated that memory 320 may include any number of memory modules, that may comprise any suitable volatile or non-volatile memory devices. An example of memory 320 may be dynamic random access memory (DRAM).

Processor 330 may be any suitable processor operable to carry out instructions on the server computer 300. The processor 330 is coupled to other units of the server computer 300 including input/output interface 310, memory 320, voice database 350, and computer-readable medium 360.

The algorithm database 340 may be any database that stores any number of predefined algorithms. In some embodiments, the predefined algorithms may be different voice de-filters that can reproduce user-provided voice segment data from modified voice segment data. Many of these filters can change the auditory characteristics of the modified voice segment data to reproduce the user-provided voice segment data. The algorithm database 340 can be updated at any time to add or remove the predefined algorithms. The algorithm database 340 can also be updated with predefined algorithms that are downloaded from the server computer 300 (FIG. 1).

The voice database 350 may be configured to store voice model(s) of users. The voice model(s) of the users may be constructed from one or more prior voice segment data received from the corresponding user. The voice segment data may be reproduced voice segments from modified voice segment data. As subsequent voice segment data are received from the communication device 110 (FIG. 2), the voice model may improve over time and the voice segment data may more accurately represent the user's voice. The voice model(s) may also include attributes such as, but not limited to, time of the authentication/payment transaction, the user or payment cardholder's name, the user-provided voice segment data associated with the payment transaction, the modified voice segment data associated with the payment transaction, the outcome of payment cardholder verification/authentication, and a match score for the voice data. These attributes of the payment user's fraud profile are described in detail in FIG. 5.

Computer-readable medium 360 may be any magnetic, electronic, optical, or other computer-readable storage medium. Computer-readable storage medium 360 includes voice data de-manipulation module 362 and match score module 366. Computer-readable storage medium 360 may comprise any combination of volatile and/or non-volatile memory such as, for example, buffer memory, RAM, DRAM, ROM, flash, or any other suitable memory device, alone or in combination with other data storage devices.

Voice data de-manipulation module 362 can be configured to cause the server computer 300 to reproduce user-provided voice segment data from modified voice segment data. In some embodiments, the reproduction of the user-provided voice segment data can include applying a predetermined algorithm from the algorithm database 340 to the modified voice segment data. By applying the predefined algorithm to the modified voice segment data, the voice data manipulation module 276 may alter the binary digits of the modified voice segment data to reproduce the user-provided voice segment data, effectively "reversing" the modification of the voice segment data by the voice data manipulation module 276 (FIG. 2).

Match score module 366 can be configured to cause the server computer 300 to calculate a match score associated with voice segment data for each user voice authentication attempt using a provided user-provided voice segment. The match score may be based on a numeric score (e.g., between 0 and 100), where the score expresses a degree of confidence that the voice segment data associated with the user-provided voice segment matches with previously captured and stored voice segment data from the user, and ultimately that the user being authenticated is the genuine user. In some embodiments, the match score may be based on a simple PASS/FAIL scale. This score can be passed on to other parts of a risk scoring mechanism, such that the score, along with other risk parameters, contributes to the overall decision of approving or declining the transaction.

It can be appreciated that in some embodiments the server computer 300 may reside within the payment processing network 140 (FIG. 1) or issuer 150 (FIG. 1).

The systems and methods described herein with respect to modification of the voice segment data associated with the user-provided voice segment can be further understood in the following illustrative example.

Figure 4:
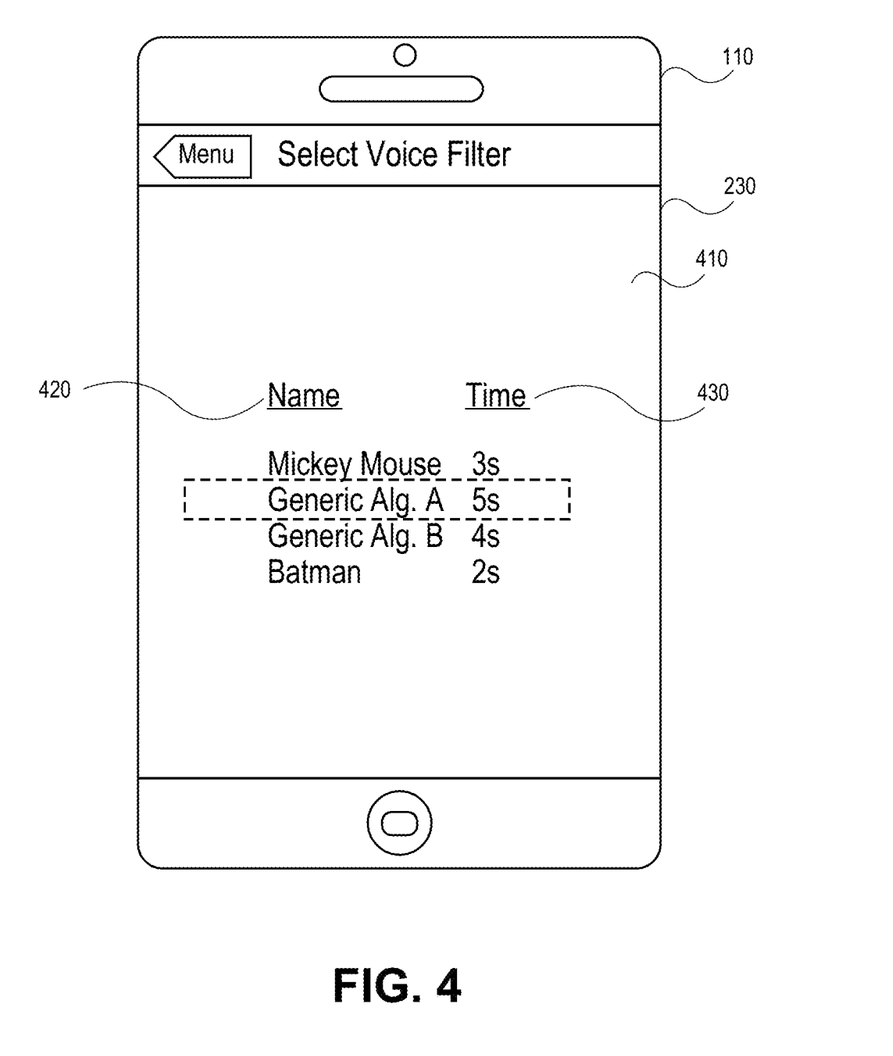
FIG. 4 shows an exemplary screen capture of selecting a voice encoding algorithm via a communication device.

FIG. 4 shows an exemplary screen capture of selecting a voice encoding algorithm via a communication device 110. The communication device 110 includes a display 230 operable for displaying a user interface 410. A user may have selected an option within an application (e.g., digital wallet application) running on the communication device 110 that indicates that the user wishes to initiate a transaction with an access device 120 (FIG. 1). The communication device 110 may then request that the user provides a voice segment based on a displayed or audible prompt. The user may speak the prompt and the communication device 110 may capture the resulting voice segment.

The user interface 410 may then prompt the user to select a voice filter by displaying a list of voice filters 420 (e.g., predetermined algorithms) along with a corresponding time estimate 430 indicating the approximate amount of time it may take to apply the predetermined algorithm (or encode) to the voice segment data associated with the user-provided voice segment using the selected voice filter 420.

For example, in FIG. 4, four possible voice filters (or predetermined encoding algorithms) are presented to the user via user interface 410: Mickey Mouse, Generic Algorithm A, Generic Algorithm B, and Batman. After the user provides the voice segment (for example, by repeating a prompt displayed by the communication device), the user may select any one of the displayed voice filters that he/she desires. The Mickey Mouse and Batman voice filters may alter the voice segment data associated with the received voice segment so that the user sounds like the popular fictional characters Mickey Mouse and Batman, respectively. In some embodiments, Generic Algorithm A and Generic Algorithm B may simply encode the voice segment data associated with the received voice segment without applying any type of filter that alters how the voice "sounds", but still alters the digital bits of the voice segment data. In this example, the user has selected Generic Algorithm A, as indicated by the rectangular selection box around the "Generic Alg. A" option within the user interface 410.

It can be appreciated that the selection of the voice filter may be done by the user either before or after providing voice segment to the communication device 110. For example, a user may first select a desired voice filter 220 and then speak something to authenticate with the system (e.g., "My name is John Doe"). It can be appreciated that voice filters 420 displayed within the user interface 410 may be those that are stored within the algorithm database 220 within the communication device 110. Additionally, while only four voice filters are shown in the example, any number of voice filters may be presented to the user via the user interface 410.

Once the communication device 110 applies the selected filter, via the voice data manipulation module 276 (FIG. 2), to the voice segment data, the filtered (or encoded) voice segment data may be referred to as modified voice segment data. The modified voice segment data may then be sent, via the voice data transmission module 274 (FIG. 2), to an authentication server (e.g., server computer 300 (FIG. 3)). The authentication server may reside within the payment processor network 140 or be a part of the issuer computer 150. The authentication server may decode the filtered (or encoded) modified voice segment data to reconstruct the original voice segment data associated with the voice segment provided the user. The decoding may be accomplished using an algorithm designed to decode the specific voice filter 420 selected by the user. The decoding algorithm may be stored within the algorithm database 340 (FIG. 3) of the server computer 300 (FIG. 3). Each voice filter 420 may have its own decoding algorithm. Since the original voice segment data associated with the voice segment provided by the user is not sent "as-is" to the authentication server, the risk level associated with a fraudster compromising the original voice segment data and using it for malicious activities may be greatly reduced.

Once the original voice segment data is reconstructed from the modified voice segment data, the authentication server may compare it against a voice model for the user to determine whether or not the user should be authenticated for the particular transaction instance. The voice model may be stored within the voice database 350 (FIG. 3) of the server computer 300 (FIG. 3). Further details of the voice database 350 (FIG. 3) are provided below.

Figure 5:
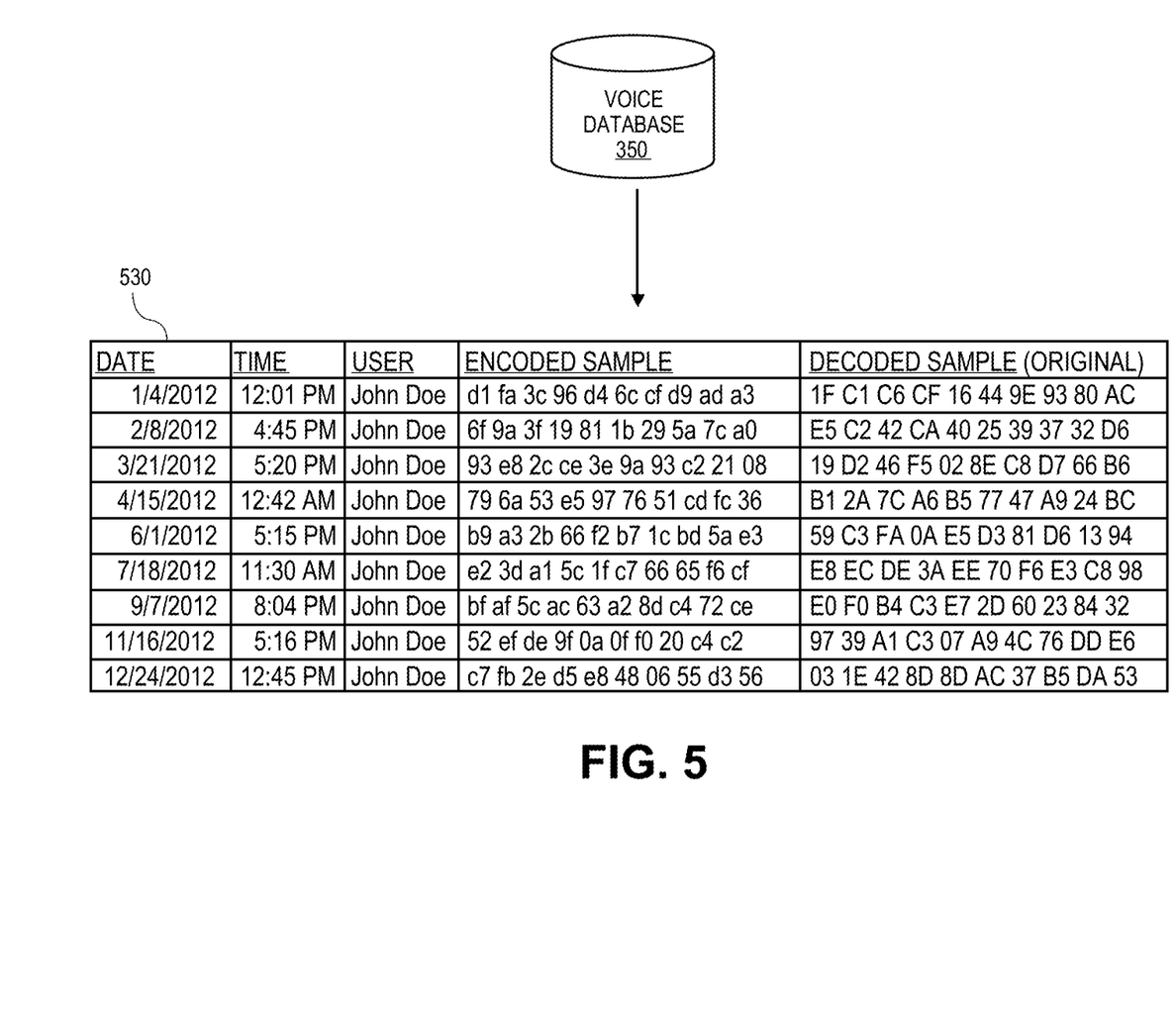
FIG. 5 shows an exemplary voice database including a voice model, according to an embodiment of the present invention.

FIG. 5 shows an exemplary voice database 350 including a voice model created from a plurality of voice segment data (associated with previous voice segments provided by the user), according to an embodiment of the present invention. The voice database 350 may reside within an authentication server (e.g., server computer 300 (FIG. 3)). The voice database 350 may include a voice recording log 530 with voice segment data for each user. The voice segment data may be stored as previous voice segments are provided by the user during the course of a transaction authorization. The voice recording log 530 may include attributes such as, but not limited to, initiation date of the payment transaction, initiation time of the payment transaction, the payment user's name, the encoded voice segment data (e.g., modified voice segment data) and the decoded voice segment data (e.g., the reconstruction of the original voice segment data associated with the voice segment provided by the user).

In this example, the voice recording log 530 shows data sets relating to nine different payment authorization requests for a user named "John Doe." Each of the nine payment authorization request data sets includes the attribute information mentioned above. The combination of the nine data sets forms the voice model for John Doe.

The date attribute of the voice recording log 530 indicates the date at which a user initiated a payment transaction using the communication device 110 (FIG. 1). In this example, the first recorded date (Jan. 4, 2012) indicates the first payment transaction initiated by the user after initially enrolling with an application (e.g., digital wallet application) running on the communication device 110 (FIG. 1). Each subsequent date represents a subsequent payment transaction initiated by the user.

The time attribute of the voice recording log 530 indicates the time of day on the date at which the user initiated the particular payment transaction.

The user attribute of the voice recording log 530 indicates the registered name for the genuine user. In this example, the registered name, "John Doe" is the same for every payment authorization request. It can be appreciated that the voice recording log 530 stores the recorded payment authorization requests for each user in a unique location within the database. Other locations within the voice database 350, not shown in this example, may contain voice models for other users having a different name.

The encoded voice sample data of the voice recording log 330 is the encoded digital representation of the modified voice segment as received by the communication device 110 (FIG. 1) upon voice authentication of the user using the specific voice filter selected by the user. In some embodiments, the modified voice segment data for each individual payment transaction request initiated by the user is unique as is the requested prompt.

The voice recording log 350 shows nine different encoded modified voice segment data representations for each of the nine payment transactions initiated by the user "John Doe." As shown, each of the modified voice segment data representations is unique. Since it is highly unlikely that each received modified voice segment data representation from the user will be identical every time and the user selected filter is the same every time, the modified voice segment data representations are unique for each transaction. For example, it is highly unlikely that a user speaks in the same tone when repeating the voice biometric prompt every time or that the requested voice prompt is the same every time. Additionally, it is likely that the user may select a different voice filter for each transaction, and it may even be ensured that the user is not presented with a selectable voice filter if he/she has already used that voice filter in the past. In some embodiments, the encoded (e.g., modified) voice segment data include an identifier bit identifying which filter or algorithm was used to encode the original voice segment data associated with the voice segmented provided by the user.

The decoded voice segment data (e.g., reconstruction of the original voice segment data associated with the voice segment provided by the user) may be compared against a voice model stored within the voice recording log 350. The voice model may be made up of all the previously stored voice segment data of the user. The most recent decoded voice segment data may be compared against the voice model and if it is consistent with the voice model, the user may be authorized for the transaction. A risk score attribute (not shown) of the voice database 350 may indicate a risk score associated with the particular authentication request by the user. In one example, the risk score may be on a scale from 0-100, with 100 being the highest (most risk). In another example, the risk score may be a simple PASS or FAIL score that indicates whether a match exists or not. The match scores may increase over time as the user authenticates with the authentication system more and becomes more "trusted" over time.

Figure 6:
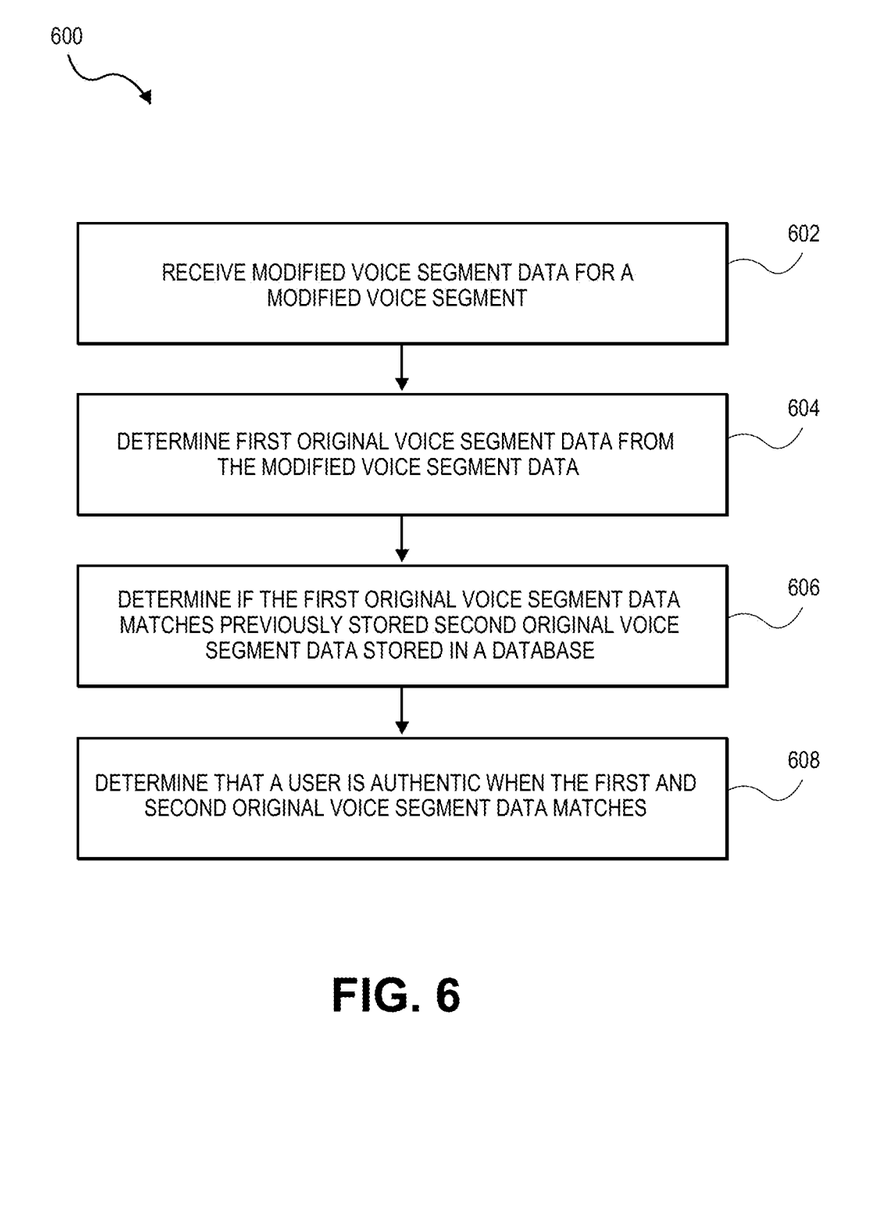
FIG. 6 is a flow diagram of an exemplary server-side method for authenticating a user for a transaction, according to an embodiment of the present invention.

FIG. 6 is a flow diagram 600 of an exemplary server-side method for authenticating a user for a transaction, according to an embodiment of the present invention. In block 602, modified voice segment data is received at a server computer from a client device. The original voice segment may have been previously provided by the user to the client device to create first original voice segment data and then the modified voice segment data. The first original voice segment data may have been modified using a first predetermined algorithm to create the modified voice segment data. The first predetermined algorithm may be a voice filter that alters the auditory characteristics of the original voice segment. Additionally, the first predetermined algorithm may be one of many predetermined algorithms stored within a database on the client device and/or server computer.

In block 604, after the modified voice segment data is received at the server computer, the first original voice segment data is determined from the modified voice segment data, using a second predetermined algorithm. The server computer may determine the original voice segment data by "decoding" the modified voice segment data using the second predetermined algorithm. The second predetermined algorithm may be specialized for decoding data that was encoded using the first predetermined algorithm. Additionally, the second predetermined algorithm may be one of many predetermined algorithms stored within a database on the server computer.

In block 606, after the first original voice segment data is determined from the modified voice segment data, a determination is made whether the first original voice segment data matches previously stored second original voice segment data stored in a database. The database may be a voice database that stores a voice models associated with one or more users. The voice model may be built up over time over a series of successful transactions and may include voice data associated with the user. The server computer may determine whether the first original voice segment data matches stored second original voice segment data in the voice model associated with the user.

In block 608, after the determination whether the first original voice segment data matches previously stored second original voice segment data in the database, a determination is made that the user is authentic when the first and second original voice segment data matches. The determination can be a determination of an absolute match (e.g., PASS or FAIL), or may be a determination of a relative match (e.g., based on a match score ranging from 0-100). If the user is determined to be authentic, the payment transaction may proceed as usual.

Figure 7:
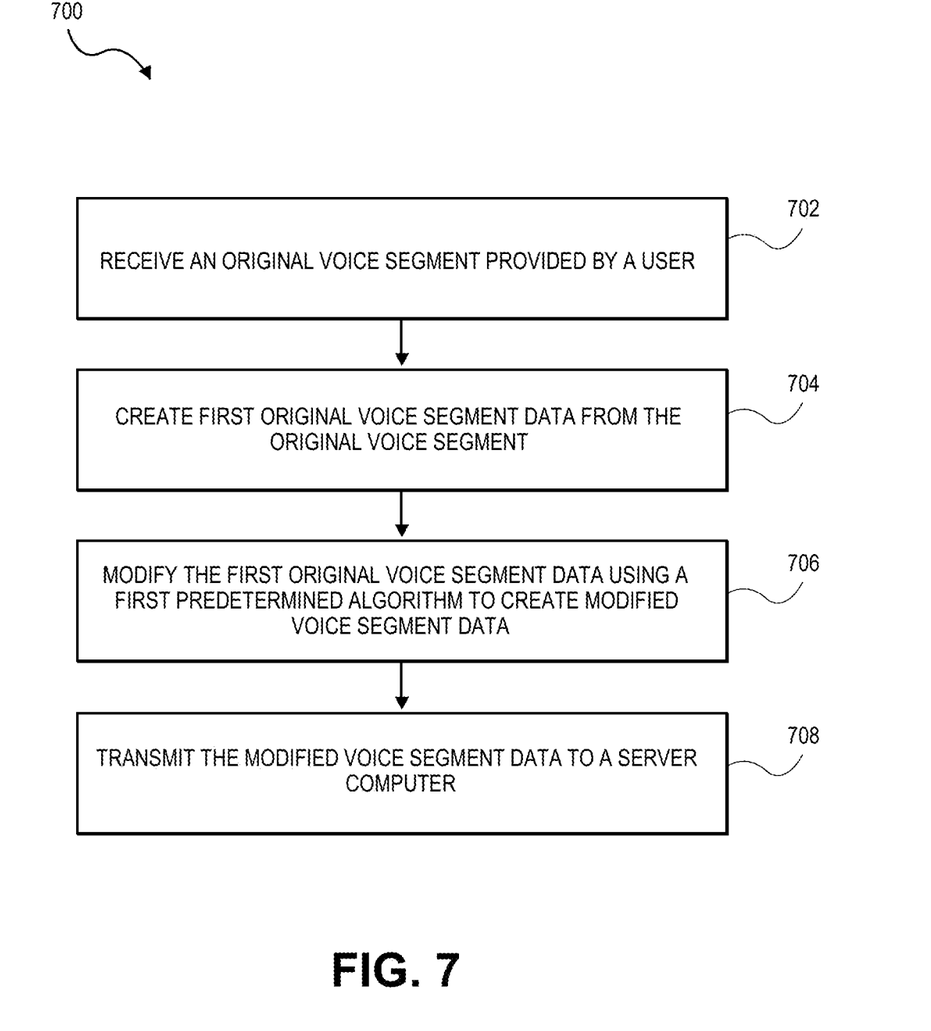
FIG. 7 is a flow diagram of an exemplary client-side method for authenticating a user for a transaction, according to an embodiment of the present invention.

FIG. 7 is a flow diagram 700 of an exemplary client-side method for authenticating a user for a transaction, according to an embodiment of the present invention. In block 702, an original voice segment provided by the user is received at a client device. The original voice segment may be provided by the user to the client device in response to a prompt displayed by the communication device. The user may repeat the prompt to provide the original voice segment.

In block 704, first original voice segment data is created from the original voice segment. The first original voice segment data may be a digitized representation (e.g., binary representation) of the original voice segment.

In block 706, the first original voice segment data is modified using a first predetermined algorithm to create modified voice segment data. The predetermined algorithm may be one of many predetermined algorithms stored in a database on the client device. The predetermined algorithm may be a voice filter that alters the auditory characteristics of the original voice segment data.

In block 708, the modified voice segment data is transmitted to a server computer. The first original voice segment data may be determined by the server computer from the modified voice segment data using a second predetermined algorithm, as described above with respect to FIG. 6. Additionally, the server computer may determine whether the first original voice segment data matches previously stored second original voice segment data stored in a database, as described above with respect to FIG. 6. Further, a determination may be made that the user is authentic when the first and second original voice segment data matches, as described above with respect to FIG. 6.

Figure 8:
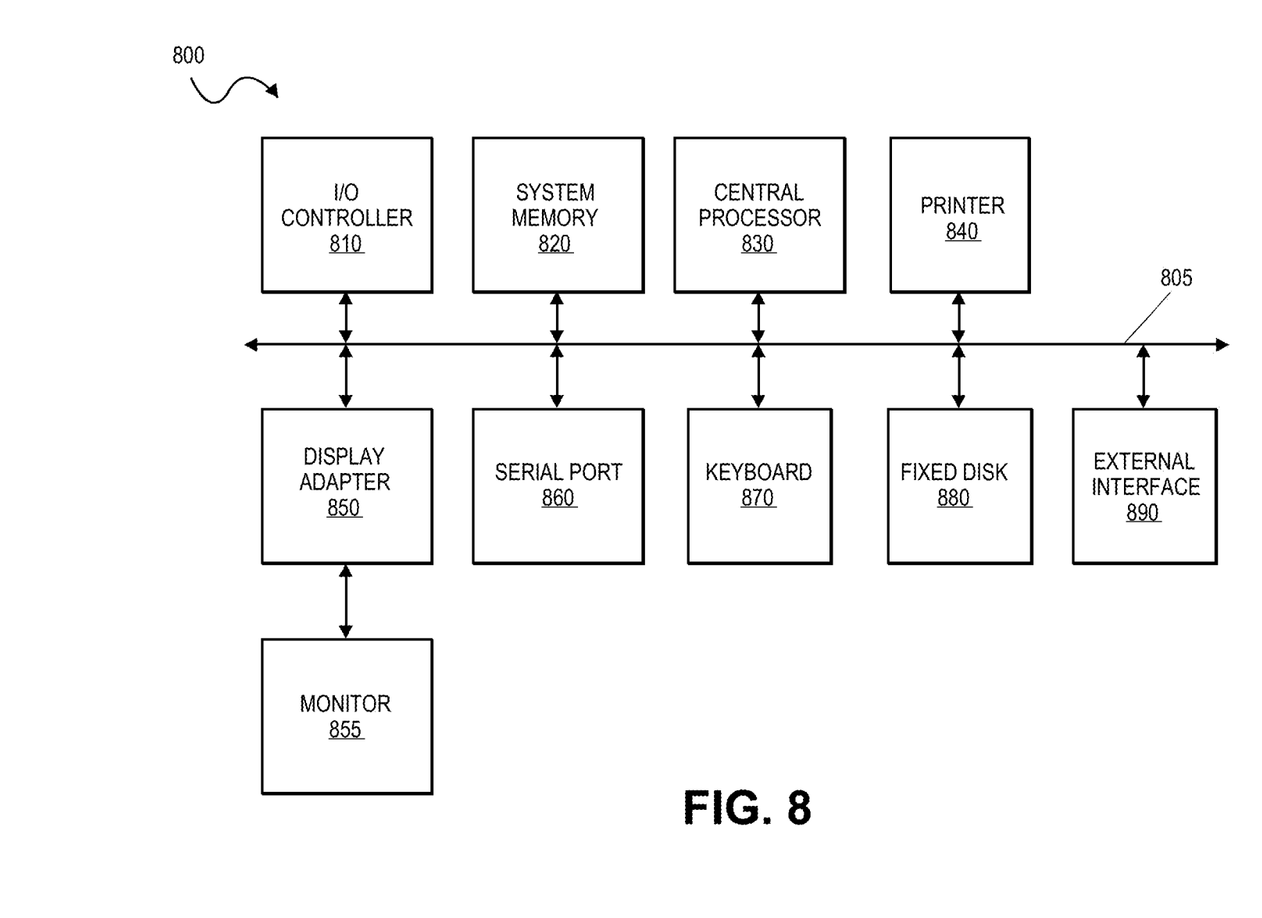
FIG. 8 shows a block diagram of an exemplary computer apparatus.

Referring now to FIG. 8, an exemplary computer system 800 according to one embodiment of the present invention is illustrated. The system 800 may be used to implement any of the computer systems described above (e.g., client computer, a server computer at the card association, a server computer at the issuer, a computer apparatus at the merchant, etc.). The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 and working memory 818, which may include RAM and ROM devices as described above. The communications systems can include, for example, a modem, a network card (wireless or wired), an infra-red communication device, etc. In some embodiments, the computer system 800 can also include a processing acceleration unit 816, such as a digital signal processor (DSP), a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 can permit data to be exchanged with the network and/or any other computer described above with respect to the system 800.

The computer system 800 may also comprise software elements, shown to be located within a working memory 518, including an operating system 820 and/or application programs 822 comprising code, such as a client application, Web browser, mid-tier application, RDBMS, etc. It should be appreciated that alternate embodiments of a computer system 800 can have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

Suitable speaker verification techniques that can be used in embodiments of the invention can also be found in U.S. patent application Ser. No. 13/899,496, filed on May 21, 2013 and Ser. No. 13/899,470, filed on May 21, 2013, which are incorporated by reference in their entirety for all purposes.

What is claimed is:

1. A method comprising:
   receiving, at a server computer from a client device, modified audio segment data, wherein a first original audio segment data was modified using a first predetermined algorithm to create the modified audio segment data;
   reproducing, by the server computer, the first original audio segment data from the modified audio segment data, using a second predetermined algorithm;
   determining, by the server computer, if the reproduced first original audio segment data matches with an audio model associated with the client device, wherein the audio model comprises a plurality of previously stored original audio segment data, and wherein the plurality of previously stored original audio segment data was captured during prior authentication attempts;
   determining, by the server computer, that the client device is authentic when the reproduced first original audio segment data matches with the audio model; and
   updating the audio model by adding the reproduced first original audio segment data to the audio model upon determining that the client device is authentic.

2. The method of claim 1, wherein determining that the client device is authentic further comprises determining a match score based at least in part on a quality of the match.

3. The method of claim 1, wherein the modified audio segment data comprises data identifying the first predetermined algorithm.

4. The method of claim 1, wherein the modified audio segment data is encoded data, and determining the reproduced first original audio segment data from the modified audio segment data comprises decoding the modified audio segment data.

5. The method of claim 1, wherein the first predetermined algorithm is selected by a user of the client device.

6. A server computer, comprising:
   a processor; and
   a non-transitory computer-readable storage medium, comprising code executable by the processor for implementing operations including:
   receiving, from a client device, modified audio segment data for a modified audio segment, wherein a first original audio segment data was modified using a first predetermined algorithm to create the modified audio segment data;
   reproducing the first original audio segment data from the modified audio segment data, using a second predetermined algorithm;
   determining if the reproduced first original audio segment data matches with an audio model associated with the client device, wherein the audio model comprises a plurality of previously stored original audio segment data, and wherein the plurality of previously stored original audio segment data was captured during prior authentication attempts;
   determining that the client device is authentic when the reproduced first original audio segment data matches with the audio model; and
   updating the audio model by adding the reproduced first original audio segment data to the audio model upon determining that the client device is authentic.

7. The server computer of claim 6, wherein determining that the client device is authentic further comprises determining a match score based at least in part on a quality of the match.

8. The server computer of claim 6, wherein the modified audio segment data comprises data identifying the first predetermined algorithm.

9. The server computer of claim 6, wherein:
   the modified audio segment data is encoded data, and determining the reproduced first original audio segment data from the modified audio segment data comprises decoding the modified audio segment data.

10. The server computer of claim 6, wherein the first predetermined algorithm is selected by a user of the client device.

11. A method comprising:
    receiving, at a client device, an original audio segment;
    creating, by the client device, first original audio segment data from the original audio segment;

modifying, by the client device, the first original audio segment data using a first predetermined algorithm to create modified audio segment data; and transmitting, to a server computer by the client device, the modified audio segment data, wherein reproduced first original audio segment data is determined by the server computer from the modified audio segment data using a second predetermined algorithm, wherein the server computer determines whether the reproduced first original audio segment data matches with an audio model associated with the client device, wherein the audio model comprises a plurality of previously stored original audio segment data, wherein the plurality of previously stored original audio segment data was captured during prior authentication attempts, wherein the client device is determined to be authentic when the reproduced first original audio segment data matches with the audio model, and wherein the server computer updates the audio model by adding the reproduced first original audio segment data to the audio model upon determining that the client device is authentic.

12. The method of claim 11, wherein determining that the client device is authentic further comprises determining a match score based at least in part on a quality of the match.

13. The method of claim 11, wherein the client device replays the modified audio segment.

14. The method of claim 11, wherein the modified audio segment data is encoded data, and determining the reproduced first original audio segment data from the modified audio segment data comprises decoding the modified audio segment data.

15. The method of claim 11, wherein the first predetermined algorithm is selected by a user of the client device.

16. A client device, comprising:
a processor; and
a non-transitory computer-readable storage medium, comprising code executable by the processor for implementing operations including:
receiving an original audio segment;
creating first original audio segment data from the original audio segment;
modifying the first original audio segment data using a first predetermined algorithm to create modified audio segment data; and
transmitting, to a server computer, the modified audio segment data, wherein reproduced first original audio segment data is determined by the server computer from the modified audio segment data using a second predetermined algorithm, wherein the server computer determines whether the reproduced first original audio segment data matches with an audio model associated with the client device, wherein the audio model comprises a plurality of previously stored original audio segment data, wherein the plurality of previously stored original audio segment data was captured during prior authentication attempts, wherein the client device is determined to be authentic when the reproduced first original audio segment data matches with the audio model, and wherein the server computer updates the audio model by adding the reproduced first original audio segment data to the audio model upon determining that the client device is authentic.

17. The client device of claim 16, wherein determining that the client device is authentic further comprises determining a match score based at least in part on a quality of the match.

18. The client device of claim 16, wherein the client device replays the modified audio segment.

19. The client device of claim 16, wherein the modified audio segment data is encoded data, and determining the reproduced first original audio segment data from the modified audio segment data comprises decoding the modified audio segment data.

20. The client device of claim 16, wherein the first predetermined algorithm is selected by a user of the client device.

* * * * *